US008042269B2

(12) United States Patent
Drury

(10) Patent No.: US 8,042,269 B2
(45) Date of Patent: Oct. 25, 2011

(54) METHOD OF MANUFACTURING A COMPONENT FOR DROPLET DEPOSITION APPARATUS

(75) Inventor: Paul R. Drury, Royston (GB)

(73) Assignee: XAAR Technology Limited, Cambridgeshire (GB)

( * ) Notice: Subject to any disclaimer, the term of this patent is extended or adjusted under 35 U.S.C. 154(b) by 761 days.

(21) Appl. No.: 10/564,969

(22) PCT Filed: Jul. 19, 2004

(86) PCT No.: PCT/GB2004/003109
§ 371 (c)(1),
(2), (4) Date: Aug. 25, 2006

(87) PCT Pub. No.: WO2005/014292
PCT Pub. Date: Feb. 17, 2005

(65) Prior Publication Data
US 2007/0000785 A1 Jan. 4, 2007

(30) Foreign Application Priority Data
Jul. 19, 2003 (GB) .................................. 0316934.9

(51) Int. Cl.
*B21D 53/76* (2006.01)
*B23P 17/00* (2006.01)
*B41J 2/015* (2006.01)
*B41J 2/15* (2006.01)
*B41J 2/145* (2006.01)
*B41J 2/135* (2006.01)

(52) U.S. Cl. ............ 29/890.1; 347/20; 347/40; 347/44; 347/45

(58) Field of Classification Search ................. 29/890.1; 347/20, 40, 44, 45
See application file for complete search history.

(56) References Cited

U.S. PATENT DOCUMENTS 4,246,076 A * 1/1981 Gardner .......................... 205/73
4,882,245 A * 11/1989 Gelorme et al. ................ 430/14
6,204,182 B1 * 3/2001 Truninger et al. ............ 438/691
6,315,397 B2 * 11/2001 Truninger et al. .............. 347/63
6,397,466 B1 * 6/2002 Koyama et al. .............. 29/890.1
6,951,622 B2 * 10/2005 Chung et al. ..................... 216/27
7,018,418 B2 * 3/2006 Amrich et al. ............... 623/23.5
7,168,166 B2 * 1/2007 Silverbrook ................. 29/890.1
7,240,433 B2 * 7/2007 Chung et al. ................. 29/890.1
(Continued)

FOREIGN PATENT DOCUMENTS

JP 6-206314 7/1994
(Continued)

OTHER PUBLICATIONS

International Search Report in PCT/GB2004/003109 dated Jan. 21, 2005.

*Primary Examiner* — A. Dexter Tugbang
*Assistant Examiner* — David Angwin
(74) *Attorney, Agent, or Firm* — Marshall, Gerstein & Borun LLP

(57) ABSTRACT

A nozzle plate component manufactured by forming a layer of photoresist on a substrate and selectively exposing and removing material to define an array of distinct bodies. Nickel is then electroformed around the bodies to form a plate, with nozzles subsequently formed by ablation through the photoresist. The process can essentially be repeated to form a guard structure around each nozzle.

15 Claims, 4 Drawing Sheets

U.S. PATENT DOCUMENTS

| | | | | |
|---|---|---|---|---|
| 7,255,977 | B2 * | 8/2007 | Yokouchi | 430/320 |
| 2003/0065401 | A1 * | 4/2003 | Amrich et al. | 623/23.55 |
| 2003/0096446 | A1 * | 5/2003 | Lim et al. | 438/99 |
| 2003/0145464 | A1 * | 8/2003 | Linliu et al. | 29/890.1 |
| 2003/0168342 | A1 * | 9/2003 | Chakravorty et al. | 205/122 |
| 2004/0088859 | A1 * | 5/2004 | Ito et al. | 29/890.1 |

FOREIGN PATENT DOCUMENTS

| | | | |
|---|---|---|---|
| JP | 06-206314 | | 7/1994 |
| JP | H06-206314 | * | 7/1994 |
| JP | 2001-191540 | A | 7/2001 |
| WO | WO 02/098666 | A1 | 12/2002 |

* cited by examiner

METHOD OF MANUFACTURING A COMPONENT FOR DROPLET DEPOSITION APPARATUS

BACKGROUND OF THE INVENTION

1. Field of the Invention

The present invention relates to a component for a droplet deposition apparatus and more particularly a nozzle plate for a droplet deposition apparatus. A n ink jet printer is a particularly important example of droplet deposition apparatus.

2. Brief Description of the Related Technology

A nozzle plate is typically attached to a body of a droplet deposition apparatus having a plurality of ink ejection chambers to provide each chamber with a respective droplet ejection nozzle. Due to the accuracy with which ejection nozzles must be formed in the nozzle plate, for example to ensure uniformity of the size and velocity of droplets ejected from the ejection chambers, laser ablation is commonly used to form the nozzles in the nozzle plate. Plastics material such as polyimide, polysulphone or other such laser-ablatable plastics material is commonly used to form the nozzle plate, and after the application of an ink-repellant layer to one face of the nozzle plate, each nozzle is formed by exposing the plate to a laser beam, such as an excimer laser beam, of appropriate diameter. The nozzle plate, complete with nozzles, is then bonded to the body of the apparatus with each nozzle aligned with a respective chamber formed in the body.

The use of plastics material for the nozzle plate tends to make the nozzle plate relatively weak, and thus prone to mechanical damage. While stiffer materials, such as metallic or ceramics material, may be used for the nozzle plate, accurate nozzles are less readily formed in the nozzle plate.

It has been proposed in the prior art, e.g. from WO 02/098666, that nozzle plates may be formed from a metal plate containing an aperture into which a polymer material is injected. A nozzle is subsequently formed through the polymeric material.

SUMMARY OF THE INVENTION

In certain of its embodiments the present invention seeks to provide an improved method for manufacturing a component for use in a droplet deposition apparatus.

In an aspect of the present invention there is provided a method of forming a nozzle plate component for a droplet deposition apparatus, said method comprising the steps: forming a body of a first material said body having a periphery, forming a plate of second material around said body such that the plate extends around at least a portion of said periphery of said body; and forming a nozzle extending through said body.

The plate is preferably formed by an electroforming technique.

The first material may be, for example, a positive or negative photoresist material. Especially preferred is a negative photoresist such as SU-8. The material may be masked and exposed to a form of radiation e.g. light to develop the unmasked portions.

The photoresist may be spun onto a substrate as a layer and subsequently processed to provide a plurality of distinct bodies. The substrate and where applied, a seed layer, may be used to form the plate material by electroforming or electroplating. The seed layer may be a sacrificial layer of copper or some other appropriate material. The nozzle plate may be formed from nickel or an electroformable alloy of nickel.

The substrate may also be used, as a support during subsequent manufacturing steps e.g. attaching the actuator unit to the nozzle plate, building electrical tracks on the nozzle plate etc. The polymeric bodies continue to provide structural support to the nozzle plate.

The bodies may be provided as an array and thus form the plate such that the material of the plate surrounds at least a portion of the periphery of the each of the bodies.

In a particularly preferred embodiment nozzles are formed through the body by an ablative technique. Other techniques such as punching or etching may provide a nozzle of appropriate quality.

The nozzle plate component may be attached to a droplet deposition apparatus prior to or post forming nozzles through the bodies.

The robustness of the nozzle plate may be further increased by providing a further material which extends over a surface of the plate and preferably also over a surface of the body. The location of the further material, which may be electroformed, may be defined by a further, non-permanent, resist defining an aperture through which droplets are ejected from the nozzles.

In one embodiment an insulating layer is provided on a surface of the nozzle plate component. Beneficially this allows for the possibility of electrical tracks being provided on said insulating layer. The tracks may be used to connect electrodes on the droplet deposition apparatus with a remote driver circuit.

In a further aspect there is provided a method of forming a nozzle plate for droplet deposition apparatus, the nozzle plate defining a nozzle plate plane and comprising a plate having at least one nozzle plate layer and a plurality of nozzles, each nozzle extending through polymeric material located within an aperture within the nozzle plate, the method being characterised by the steps of defining a plurality of distinct bodies of polymeric material distributed over the nozzle plate plane and forming at least one metal nozzle plate layer by electroforming around said bodies of polymeric material.

Preferably, the nozzle plate comprises a first nozzle plate layer containing said apertures and the polymeric material located within said apertures through which the nozzles extend, and a second nozzle plate layer comprising a guard layer.

In yet a further aspect, the present invention consists in a method of forming a nozzle plate component for a droplet deposition apparatus, said method comprising the steps of: forming a layer of first photoresist material on a substrate; selectively exposing and removing photoresist material to define on the substrate an array of distinct bodies of said first material; forming a first plate of metal around said bodies, so as to form a metal nozzle plate having apertures, each aperture containing a body of said first material; and forming a nozzle extending through each body.

BRIEF DESCRIPTION OF THE DRAWINGS

The present invention will be described, by way of example only, with reference to the following drawings in which:

FIG. 1 depicts a nozzle plate according to WO 02/098666. The nozzle plate 1 is formed of a metallic plate 2 with an etched aperture. A polymeric material 4 is inserted into the aperture and subsequently a nozzle bore 6 is formed either by punching or ablation.

FIG. 2*a*) to *e*) describes a method of forming the nozzle plate component according to the present invention. A copper seed layer 8 is deposited onto a substrate 10. A layer 12 of photoresist is spun onto the seed layer.

DETAILED DESCRIPTION OF THE PREFERRED EMBODIMENTS

A preferred photoresist material is SU-8, a negative, epoxy-type, near-UV photoresist based on EPON SU-8 epoxy resin (from Shell Chemical) originally developed by IBM and the subject of U.S. Pat. No. 4,882,245. SU-8 epoxy resin is a fully epoxidized bisphenol-A/formaldehyde novolac co-polymer having a characteristically inherent rigid molecular structure. Combined with the appropriate photo acid generator (PAG), it becomes a thick film negative resist. SU-8 photoresist is commercially available from MicroChem Inc. (previously Microlithography Chemical Corp.), 1254 Chestnut Street, Newton, Mass. USA. Further information is available at: http://www.microchem.com/products/su_eight.htm The photoresist is masked, exposed and developed to leave a plurality of discrete bodies 4. The plate material 2 is subsequently electroplated or electroformed onto the copper seed layer thus forming a composite nozzle plate unit. The preferred plate material is nickel or an appropriate electroformable alloy of nickel.

The nozzle plate unit may be released from the substrate by etching the copper seed layer to form a nozzle plate component. Nozzles may then be formed through the in-situ photoresist material either before the nozzle plate is attached to an actuator unit (ex-situ) or after the nozzle plate is attached (in-situ).

It has been discovered that SU-8 photo resist can be ablated at a constant high fluence (8 J/cm2) without damage to the nozzle plate. The benefit of ablating at a high fluence is that the nozzles may be formed at up to three times the rate of conventional methods.

Overplating a portion of the resist provides a level of mechanical protection to the nozzles from paper impacts etc.

One of the additional benefits of the present technique is that the structural photo-imageable resists allow further structures to be built on the nozzle plate before ablating the nozzles and while it is still attached to the substrate.

Figure 1:
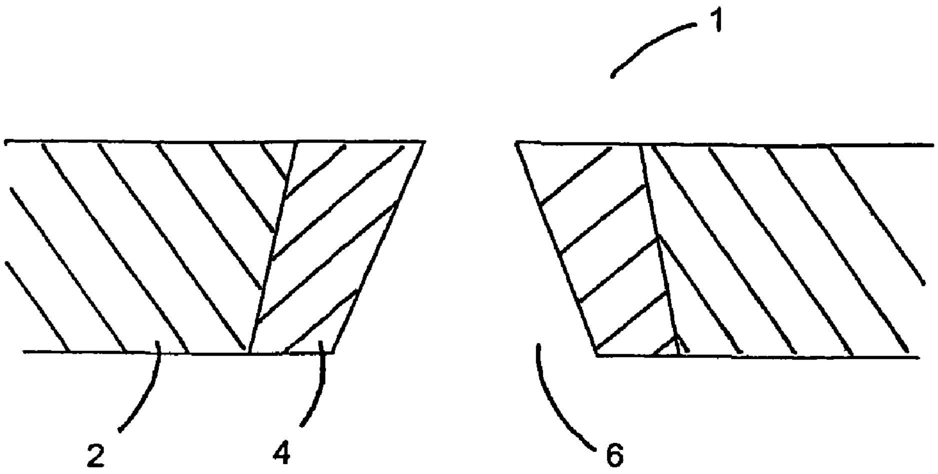
FIG. 1 shows a nozzle plate structure known in the prior art.
Figure 2A:
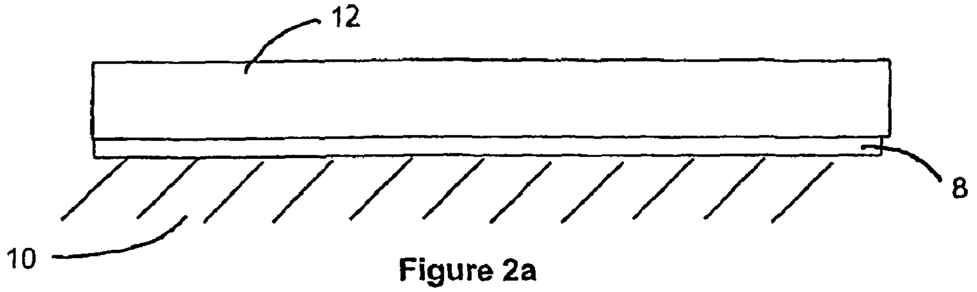
FIGS. 2*a*) to 2*e*) show a method of manufacturing a nozzle plate according to the present invention.
Figure 2B:
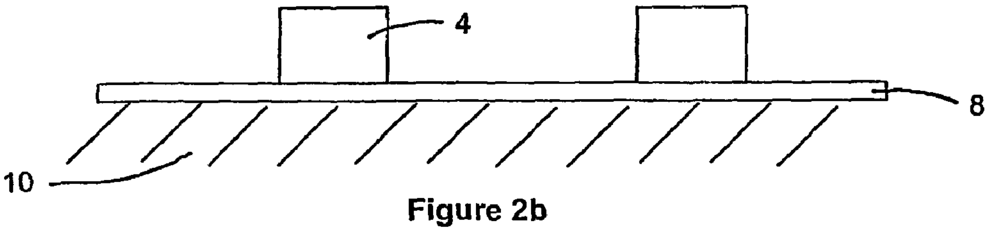
Figure 2C:
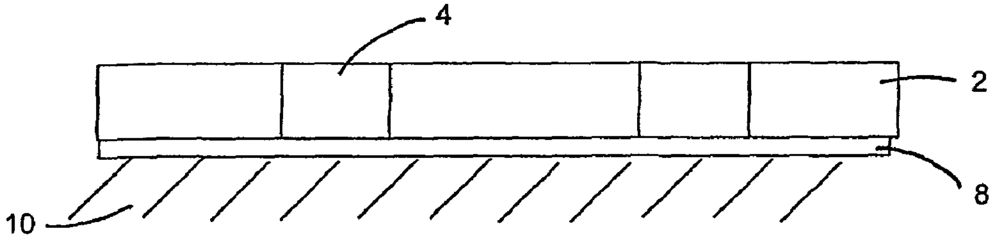
Figure 2D:
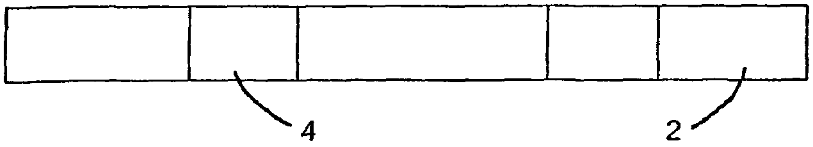
Figure 2E:
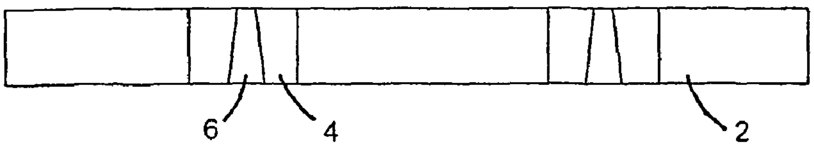
Figure 3A:
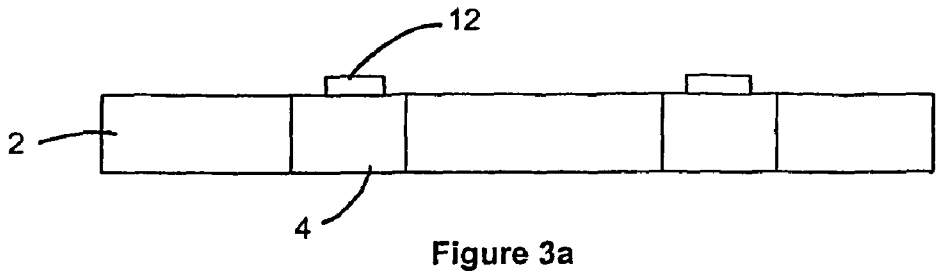
FIG. 3*a*) to 3*c*) describe a technique of forming a guard on a nozzle plate.
Figure 3B:
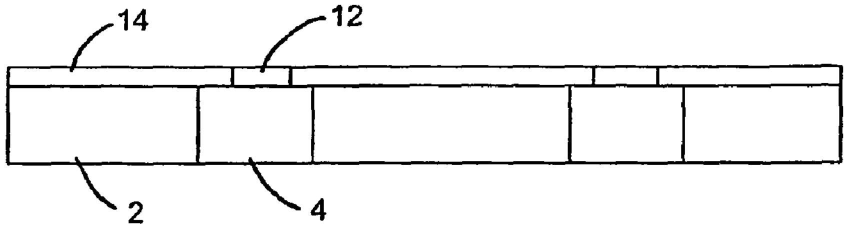
Figure 3C:
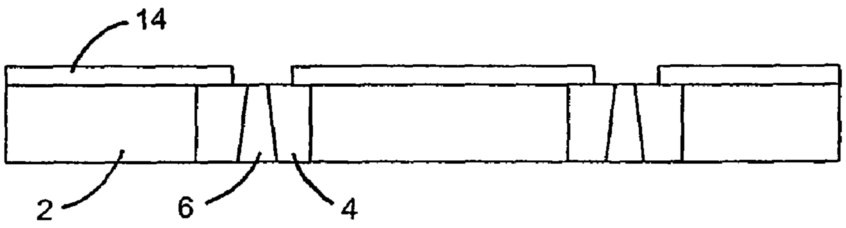

In FIG. 3, a guard plate is formed on the nozzle plate thereby providing an protective layer. Firstly a second layer of photoresist 12 is deposited onto the nozzle plate component and this is patterned, exposed and developed to leave portions which extend over the structural resist. This photoresist material will typically be different from the first photoresist material and a wide range of photoresist materials will be suitable.

A metal layer 14 is electroformed around the photoresist 12 and subsequently the photoresist is removed to leave apertures. Nozzles are then formed as described above.

In a modification, the nozzles are formed prior to removal of the second photoresist with the nozzles being ablated through the photo resist to protect what will become the front face of the nozzle plate.

Figure 4A:
FIG. 4*a*) to 4*c*) show a method of forming a nozzle plate for attachment to an electrical circuit.
Figure 4B:
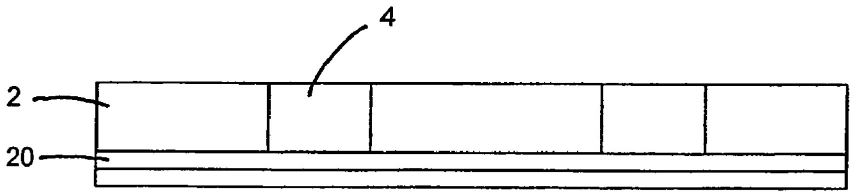
Figure 4C:
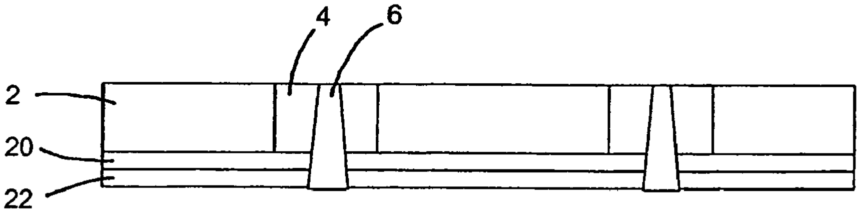

It is also possible to form other features that may be located on either side of the nozzle plate. FIG. 4 illustrates a technique of forming a nozzle plate having a conductive track attached thereto. The electroformed plate, while still attached to the substrate has spun thereon a further layer of an electrical insulation material 20 which will isolate the metal of the nozzle plate component from the metallic tracks formed in the track component 22. The track component may be a separately formed sheet or may simply comprise tracks formed onto the insulating sheet 20.

A wide variety of modifications can be made without departing from the scope of the invention. Thus, the described arrangements are only examples of arrangements of nozzle plate layers with at least one metal nozzle plate layer being formed by electroforming around said bodies of polymeric material. A guard layer may be formed in this way on a nozzle plate layer formed—for example—by one of the techniques disclosed in WO 02/098666.

While the combination of a nickel nozzle plate electroformed around defined bodies of photo resist material is particularly preferred, the skilled man will recognise that there are a variety of techniques for forming a body of preferably plastics material, said body having a periphery, and forming a plate of preferably metal material around said body such that the plate extends around at least a portion of said periphery of said body. Similarly nozzles can be formed in a variety of ways other the preferred technique of laser ablation.

Each feature disclosed herein may be used either alone or in conjunction with one or more of other disclosed features.

The invention claimed is:

1. A method of forming a nozzle plate for droplet deposition apparatus, including the steps of:

defining a plurality of distinct bodies of polymeric material distributed over a nozzle plate plane, each said body having a periphery, forming a plurality of nozzles, each nozzle extending through one of said distinct bodies of polymeric material distributed over the nozzle plate plane, and subsequently to said step of defining a plurality of distinct bodies of polymeric material, forming at least one metal nozzle plate layer by electroforming around said peripheries of said bodies of polymeric material so that each of said distinct bodies of polymeric material is located within a corresponding one of a plurality of apertures within said metal nozzle plate layer and so that said peripheries of said bodies of polymeric material define at least in part the shapes of said apertures;

to provide a nozzle plate extending over said nozzle plate plane.

2. A method according to claim 1, wherein each of said nozzles is formed by ablating each of said nozzles through one of said distinct bodies of polymeric material located within a corresponding one of a plurality of apertures within said metal nozzle plate layer.

3. A method according to claim 1, further comprising the step of forming a further layer in addition to said metal nozzle plate layer, said further layer comprising a plurality of apertures aligned with said nozzles.

4. A method of forming a nozzle plate component for a droplet deposition apparatus, said method comprising the steps of:

forming a layer of first photoresist material on a substrate;

subsequently selectively exposing and removing some of said first photoresist material to define on the substrate an array of distinct bodies of said first photoresist material;

subsequent to said step of selectively exposing and removing first photoresist material, forming a first plate of metal around said distinct bodies of said first photoresist material, so as to form a metal nozzle plate having an array of apertures corresponding to said array of distinct bodies of said first photoresist material, each aperture containing one of said bodies of said first photoresist material; and forming a nozzle extending through each of said distinct bodies of said first photoresist material.

5. A method according to claim 4, further comprising the step of depositing a metallic layer on the substrate prior to forming of the layer of first photoresist material, said first plate of metal being electroformed with said metallic layer serving as a seed layer.

6. A method according to claim 4, wherein each of said nozzles is formed by ablating each of said nozzles through one of said distinct bodies of said first photoresist material contained within an aperture in said first plate of metal.

7. A method according to claim 4, wherein each of said nozzles has a diameter and wherein said step of selectively exposing and removing said first photoresist material to define on the substrate an array of distinct bodies of said first photoresist material comprises applying a mask, said mask comprising an array of distinct mask features corresponding to said array of distinct bodies, each of said mask features having a diameter greater than the diameter of the nozzle of the corresponding body of first photoresist material.

8. A method according to claim 4, further comprising the step of forming a further layer in addition to said metal nozzle plate layer, said further layer comprising a plurality of apertures aligned with said nozzles.

9. A method according to claim 1, wherein the nozzle plate comprises a first nozzle plate layer containing said apertures and the polymeric material located within said apertures through which the nozzles extend, and a second nozzle plate layer comprising a guard layer.

10. A method according to claim 9, wherein said guard layer comprises, for each nozzle, a guard aperture which is a dimension in the nozzle plane larger than that of the nozzle and smaller than that of the polymeric material through which the nozzle extends.

11. A method according to claim 9, wherein said second nozzle plate layer is formed by the steps of defining a plurality of distinct bodies of guard layer polymeric material distributed over the first nozzle plate layer, forming said guard layer by electroforming around said bodies of polymeric material and removing said guard layer polymeric material.

12. A method according to claim 11, wherein said guard layer polymeric material is removed prior to formation of nozzles.

13. A method according to claim 11, wherein nozzles are formed by ablation prior to removal of said guard layer polymeric material.

14. A method according to claim 1, wherein the nozzle plate comprises a first nozzle plate layer containing said apertures and the polymeric material located within said apertures through which the nozzles extend, and a second nozzle plate layer comprising a connecting tracks layer.

15. A method according to claim 4, further comprising the steps of:

forming a layer of second photoresist material on the first plate of metal;

selectively exposing and removing some of said second photoresist material to define an array of distinct bodies of said second photoresist material aligned respectively with the bodies of said first photoresist material;

forming a second plate of metal around said bodies of second material; and removing said second photoresist material to form apertures in the guard plate respectively aligned with the nozzles.

* * * * *